US008272113B1

(12) United States Patent
Marks

(10) Patent No.: US 8,272,113 B1
(45) Date of Patent: Sep. 25, 2012

(54) GROMMET INSTALLATION DEVICE AND METHOD

(75) Inventor: Charles C. Marks, Springfield, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1205 days.

(21) Appl. No.: 12/045,554

(22) Filed: Mar. 10, 2008

(51) Int. Cl.
*B23P 19/00* (2006.01)

(52) U.S. Cl. ................................. 29/270; 29/278; 269/3

(58) Field of Classification Search .................... 29/270, 29/278, 255, 271; 269/3, 6, 95
See application file for complete search history.

(56) References Cited

U.S. PATENT DOCUMENTS 2,441,756 A 5/1948 Swart
2,466,952 A 4/1949 Jakubowski
3,852,839 A * 12/1974 Blessing ........................... 7/100
4,334,445 A * 6/1982 Timewell ..................... 81/177.7
4,606,106 A 8/1986 Dutton
4,809,872 A 3/1989 Pavur
5,022,292 A 6/1991 Hammer et al.
5,341,559 A 8/1994 Reid et al.
6,042,296 A 3/2000 Wittig et al.
6,279,885 B1 * 8/2001 Leon, Jr. ........................... 269/8
6,701,595 B2 3/2004 Janovici et al.
7,059,218 B1 * 6/2006 Lin et al. ........................... 81/60
7,108,461 B1 * 9/2006 Colburn et al. ............... 409/131
7,137,323 B1 * 11/2006 Hsieh .............................. 81/467

* cited by examiner

*Primary Examiner* — Lee D Wilson
(74) *Attorney, Agent, or Firm* — Standley Law Group LLP

(57) ABSTRACT

A grommet and/or plug installation device and associated installation method. The device includes a head portion that is adapted to releasably retain a grommet and/or plug. The head is preferably connected to a handle that is grasped by a user during the grommet/plug installation process. The grommet or plug is retained on the head with less of a retention force than will be exhibited between the grommet or plug and an associated opening to which the grommet or plug is inserted. As such, a grommet or plug will remain in an associated opening after insertion thereto, and the device of the present invention used to install the grommet or plug may be withdrawn.

15 Claims, 6 Drawing Sheets

GROMMET INSTALLATION DEVICE AND METHOD

INVENTIVE FIELD

The present invention is directed to a device and method for installing grommets. More particularly, the present invention is directed to a device and method that allows for installing one or a variety of grommets, the device preferably being adjustable to facilitate use by multiple installers.

BACKGROUND OF THE INVENTIVE FIELD

During the manufacturing processes of various products, holes or other openings are often fabricated within components such as panels, plates or other structures. Manufacturers commonly use grommets or plugs to shield the edges of these openings.

Typically, grommets and plugs protect items such as electrical wire, cord, rope, lacings, etc., that pass through such openings. Without a grommet, over time, the movement of these items may result in damage thereto from abrasions or cuts.

Generally, grommets and plugs are made of rubber, plastic or metal with a smooth and sometimes softer inner surface that shields items passing through an associated opening from damage. A grommet is typically larger than the opening in which it is installed. Plugs commonly include retention elements that extend outward to some distance greater than the size of an opening into which they will be installed. Accordingly, it can be an arduous process to affix a grommet or plug within a corresponding opening. Additionally, in a manufacturing environment, installers of different heights and body geometries may install grommets or plugs to the same openings in a particular component (e.g., during different shifts). Moreover, in some manufacturing processes, multiple openings must be filled with various grommets or plugs within a short period of time. As a result, providing a device for installing grommets or plugs, and/or grommets or plugs of various different materials, geometries and/or sizes may increase productivity.

Obviously, installing such grommets and plugs can be time consuming. Therefore, creating a device and method that minimizes the time required to install grommets and/or would be advantageous. Further, providing a device that is adjustable between numerous positions so as to accommodate different users is also desirable for ergonomic reasons.

Consequently, it can be understood that there is a need for a device and method for facilitating grommet and/or plug installation. Preferably, such a device and method would allow a user to install grommets and/or plugs easily and in a timely manner. Such a device may also be designed for use with grommets and/or plugs of different materials, geometries and/or sizes. Preferably, such a device would further allow for comfortable use by users having different heights, body geometries and/or other dissimilarities. It is also preferable that such a device be simple in design, lightweight, and easy to transport and adjust. A device and method of the present invention satisfies these needs/preferences.

SUMMARY OF THE GENERAL INVENTIVE CONCEPT

The present invention is directed to a device for installing grommets and/or plugs (hereinafter, collectively "grommets"), and to a method for the installation thereof. Certain embodiments of a device of the present invention may be useable to install grommets of different materials, sizes and/or geometries. A manually operable device of the present invention generally includes a handle with a head attached to one end thereof. The head may be pivotably connected to the handle and/or the handle may be adjustable, such as telescopically, to allow for comfortable use of the device by different installers. The head is designed to releasably retain a grommet during a grommet installation process.

A device of the present invention may be employed by an installer to manually insert a grommet into an associated opening, whereafter the grommet will remain in the opening and the device may be withdrawn. Alternatively, an automated device of the present invention may also be provided to perform such installation. For example, the head portion of a device of the present invention may be affixed to a robot or other automated apparatus to effect grommet installation.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1:
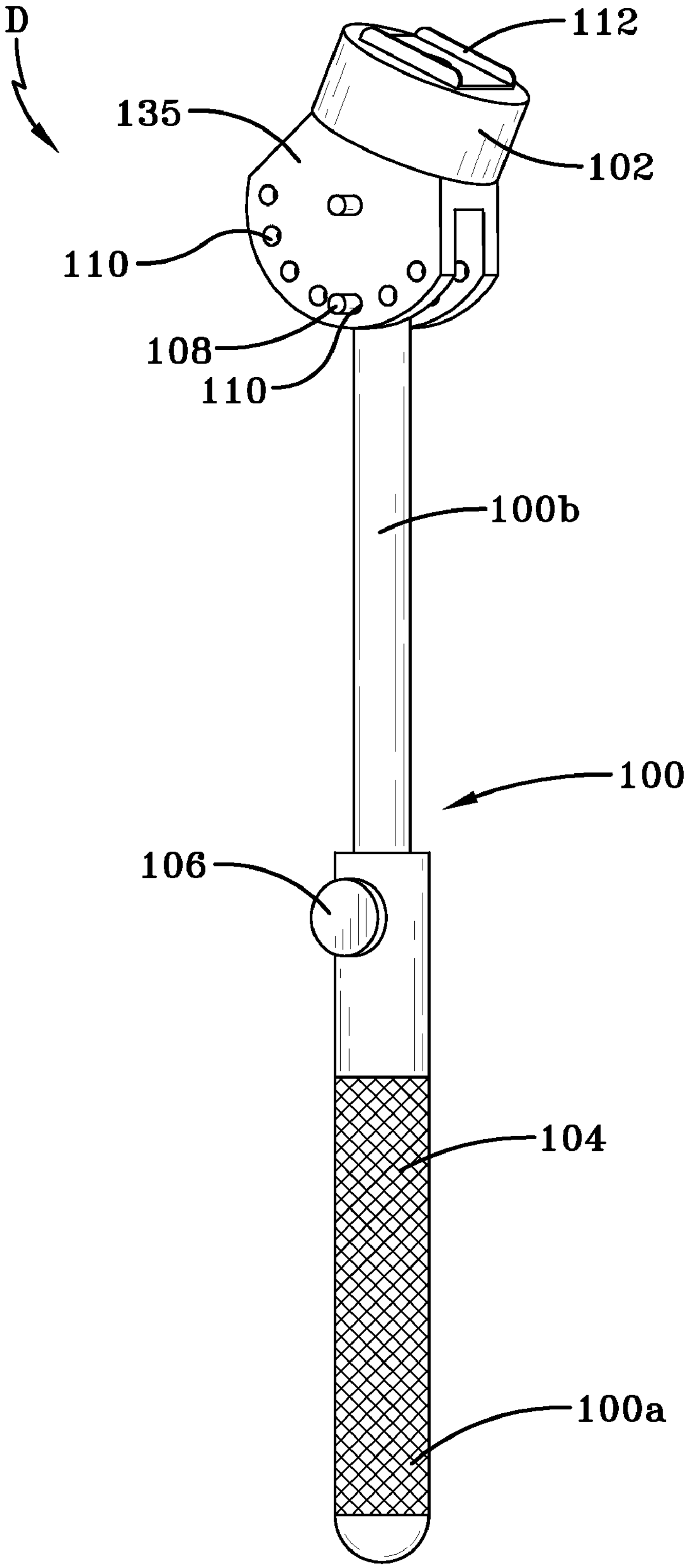
FIG. 1 is a perspective view illustrating one exemplary embodiment of a grommet installation device of the present invention.

FIG. 1 depicts one exemplary embodiment of a grommet installation device of the present invention. As shown, this particular grommet installation device D (hereinafter "grommet device" or "device") includes a handle 100 with a first and second end 100*a*, 100*b*. A grommet retaining/installing head 102 is attached to the second end 100*b* of the handle 100.

In this embodiment, the handle 100 is cylindrical in shape to facilitate grasping of the grommet device D by an installer during use thereof. As such, the handle 100 may be manufactured from readily available sizes of bar stock, thereby reducing manufacturing time and expense. However, it should be realized that the handle 100 may have any number of cross-sectional geometries that permit gripping during use of the grommet device D, whether by a user during manual operation, or by a machine during automated operation. Preferably, but not necessarily, the cross-sectional geometry allows for telescoping of the handle. In this manner, the overall length of the grommet device D may be easily adjusted to accommodate different users.

The handle 100 may be made of any number of materials, such as, for example, fiberglass, plastics or metals. Preferably, the handle 100 has sufficient strength to permit proper operation of the device D. A handle of a grommet installing device of the present invention may be provided with one or more grip assisting features. For example, in this particular embodiment, the handle 100 is provided with a knurled texture 104. A variety of other textures and/or treatments for improving grip may also be applied, as would be understood by one of skill in the art.

Figure 2:
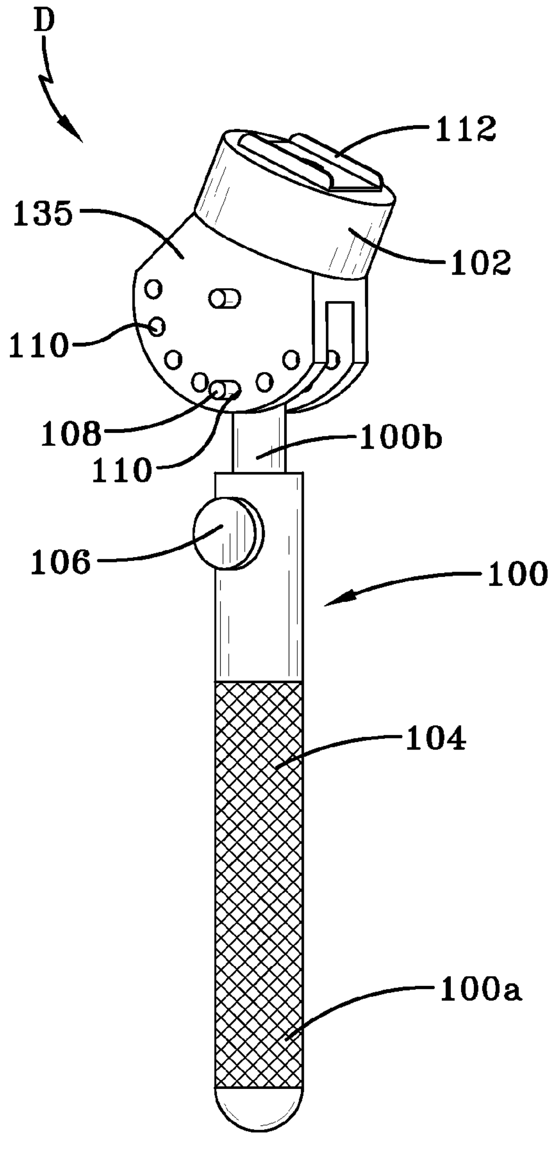
FIG. 2 illustrates the exemplary embodiment of FIG. 1 with a handle portion thereof in a fully retracted position.

FIGS. 1-2 illustrate how the telescoping function of the handle 100 of this particular embodiment of the grommet device D may function. As shown, this particular handle is adjustable in length, and a thumb screw 106 is provided to fix the length of the handle 100 once set. One skilled in the art would realize that there are also a multitude of other ways to fix the length of such a handle, and all are contemplated by the present invention.

Figure 3:
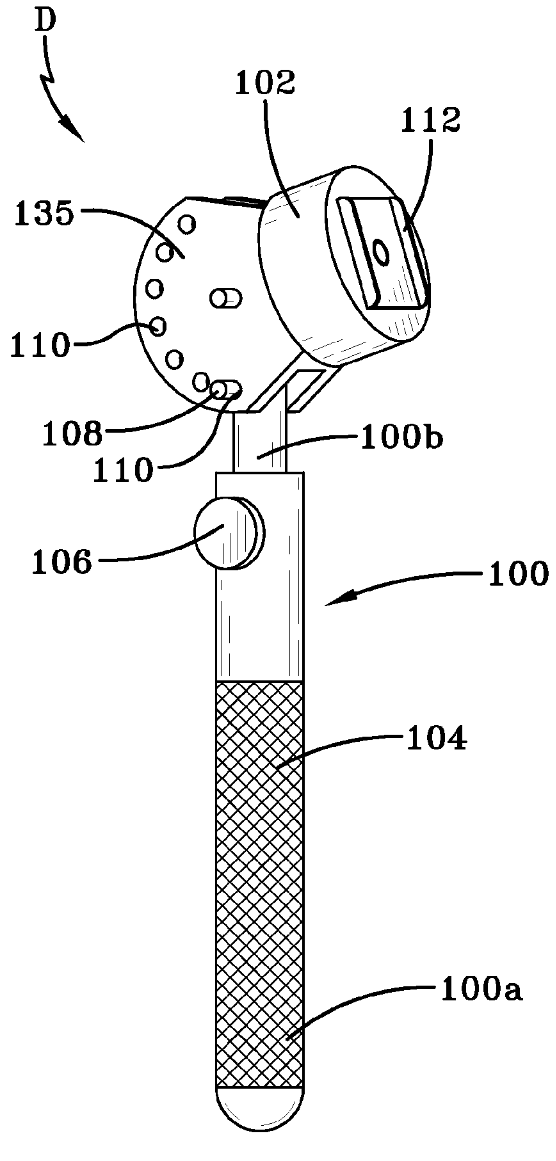
FIG. 3 depicts the exemplary embodiment of FIG. 2 with a head portion thereof rotated to a different position.

It can be understood by reference to FIGS. 2-3 that a head portion of a grommet installing device of the present invention may be pivotably connected to a handle portion. As shown, this particular head 102 is pivotably connected to the handle 100 in a manner that allows the angle therebetween to be adjusted and set. While the angle between the head and handle portions of a grommet installing device of the present invention may be set by a number of mechanisms, the angle between the handle 100 and the head 102 of this embodiment is fixed by an adjuster pin 108 that is inserted through an adjustment hole 110 in a mounting bracket portion 135 of the head.

However, depending on the materials used to construct a grommet device D of the present invention, and or other design or operational factors, one skilled in the art would understand that the head 102 may be also be attached to the handle 100 by any other number of connecting means, such as by a ball and socket joint, welding, with threaded fasteners, etc. It is also possible for the head 102 to be integral to the handle 100, such as by molding, turning, or other manufacturing techniques.

Figure 4A:
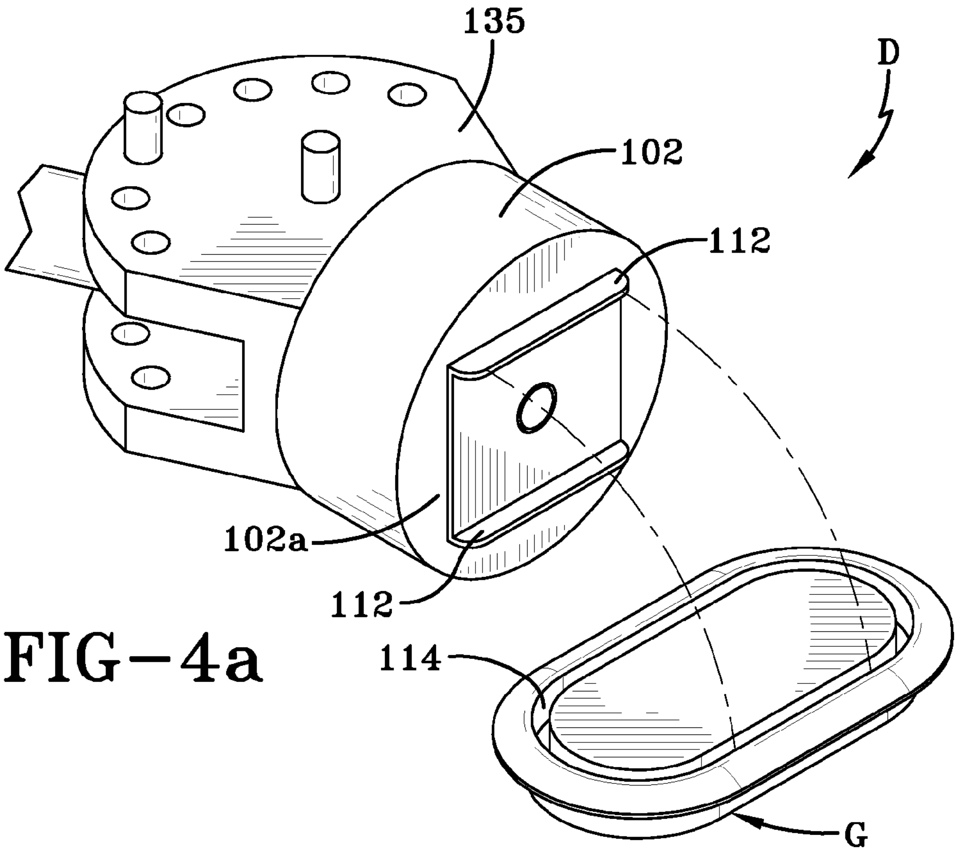
FIG. 4*a* is an enlarged view of one exemplary embodiment of a head portion of a grommet installation device of the present invention, along with an exemplary grommet the device may be used to install.
Figure 4B:
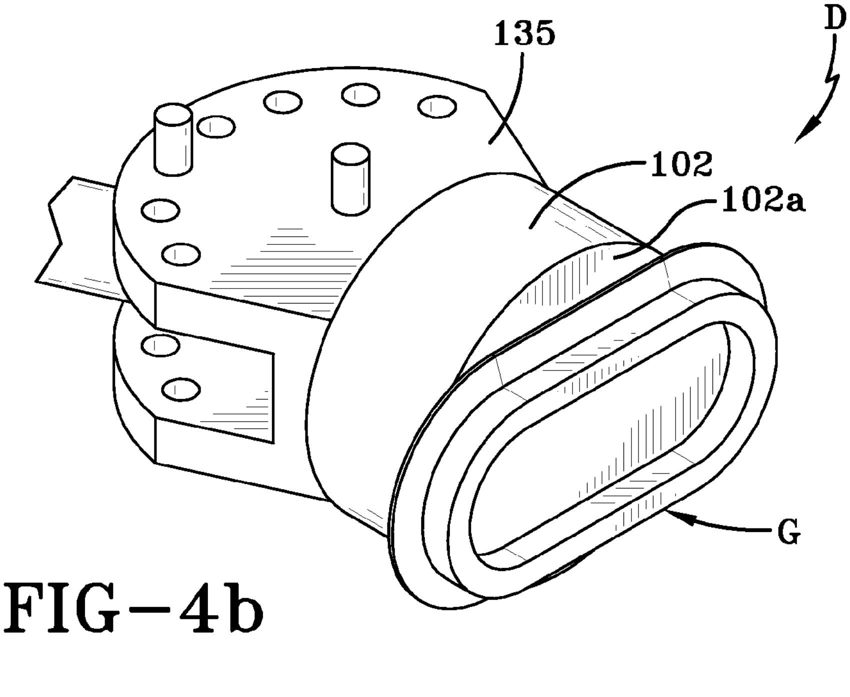
FIG. 4*b* shows the grommet and head portion of FIG. 4*a* with the grommet releasably retained by the head portion.

In whatever form, a head portion of a device of the present invention is designed to releasably retain a grommet. For example, FIGS. 4*a*-4*b* show an enlarged view of the exemplary head 102, along with a grommet G that can be installed using grommet installing device D. This embodiment of the head 102 is designed to releasably retain the grommet G by frictional force. To that end, the head 102 includes projections 112 that extend from an installation end 102*a* of the head to engage similarly-shaped grooves 114 in a face of the grommet G. The frictional force between the grooves 114 in the grommet G and the projections 112 on the head 102 is sufficient to releasably retain the grommet G on the head during the grommet installation process. While the projections 112 of this particular head 102 are of linear design, it is to be understood that such projections may be of virtually any shape or size necessary to engage and releasably retain a grommet of interest. Projections may be provided to retain grommets of varying size and geometry, or may be designed to retain only one particular grommet.

Figure 5A:
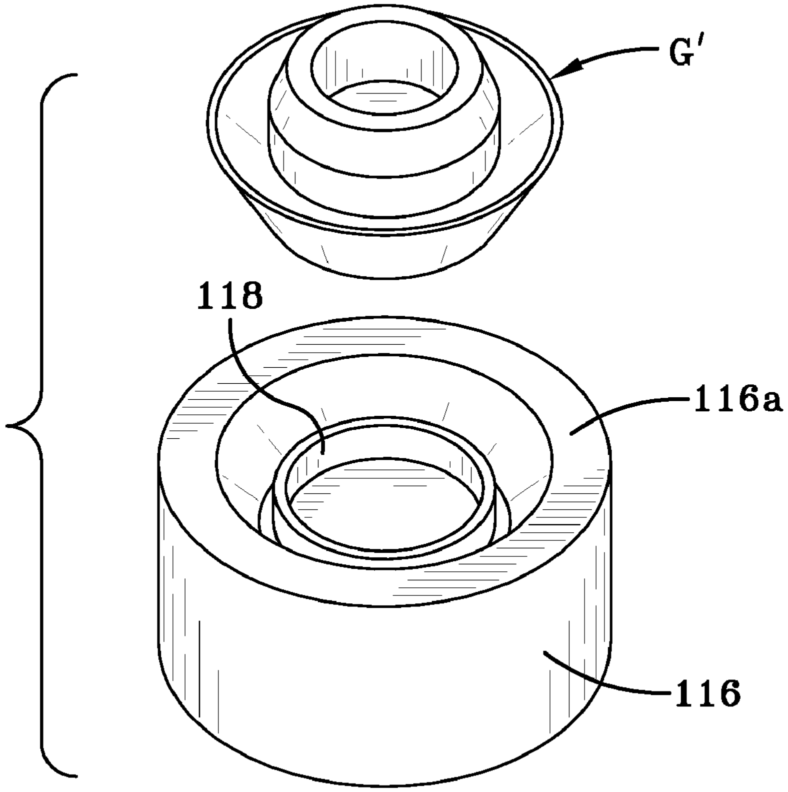
FIG. 5*a* is an enlarged view of a different head portion of a grommet installation device of the present invention, along with an exemplary grommet the device may be used to install.
Figure 5B:
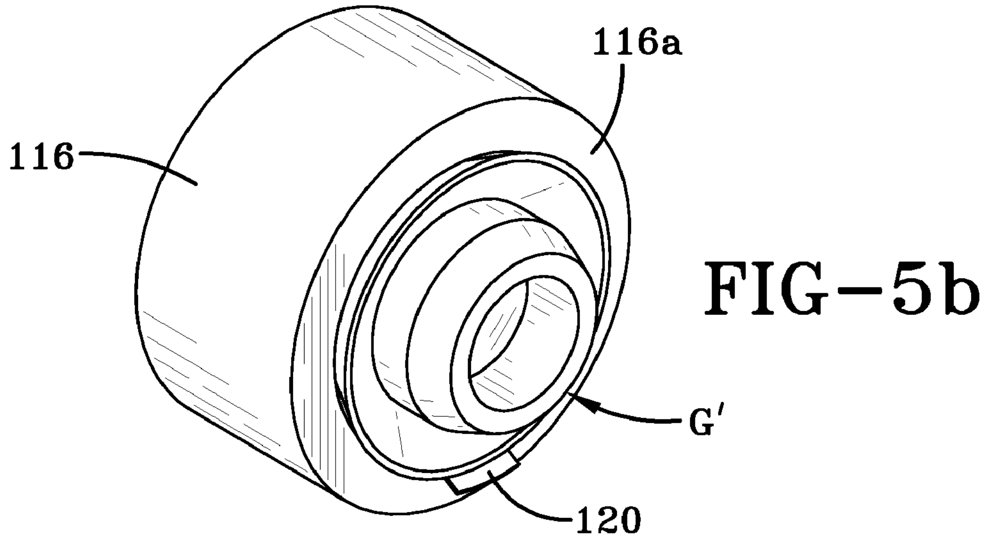
FIG. 5*b* shows the grommet and head portion of FIG. 5*a* with the grommet releasably retained by the head portion.

FIGS. 5*a*-5*b* illustrate an alternative embodiment of a head 116 that can be employed on a device of the present invention for purposes of grommet installation. Unlike the head 102, the installation end 116*a* of this grommet retaining/installing head 116 preferably includes an aperture 118 or other recess for releasably retaining a grommet G'. The aperture 118 may be of various shape, size and depth to retain grommets of various dimensions. In this exemplary embodiment, the aperture 118 is of circular cross-section in order to best accommodate the round shape of the grommet G'. Preferably, the depth of the aperture 118 is a least sufficient to allow a portion of the grommet G' to reside within the head 116.

In certain embodiments of the present invention, frictional contact between the inside walls of the aperture 118 or recess and the exterior of the grommet G' may function to releasably retain the grommet G'. In other embodiments, such as that shown in FIG. 5*b*, a separate retention element may be used for this purpose. For example, this particular head 116 may include a flat spring 120 that is attached thereto. The flat spring 120 is provided to press against the wall of the grommet G' when the grommet resides within the aperture 118 in the head 116. Use of a flat spring or similar retention element may function to releasably retain a grommet in a head, while also more easily releasing the grommet once the grommet is installed to an associated opening. Other alternative grommet retention elements and/or techniques may also be employed, as would be apparent to one of skill in the art.

Figure 6A:
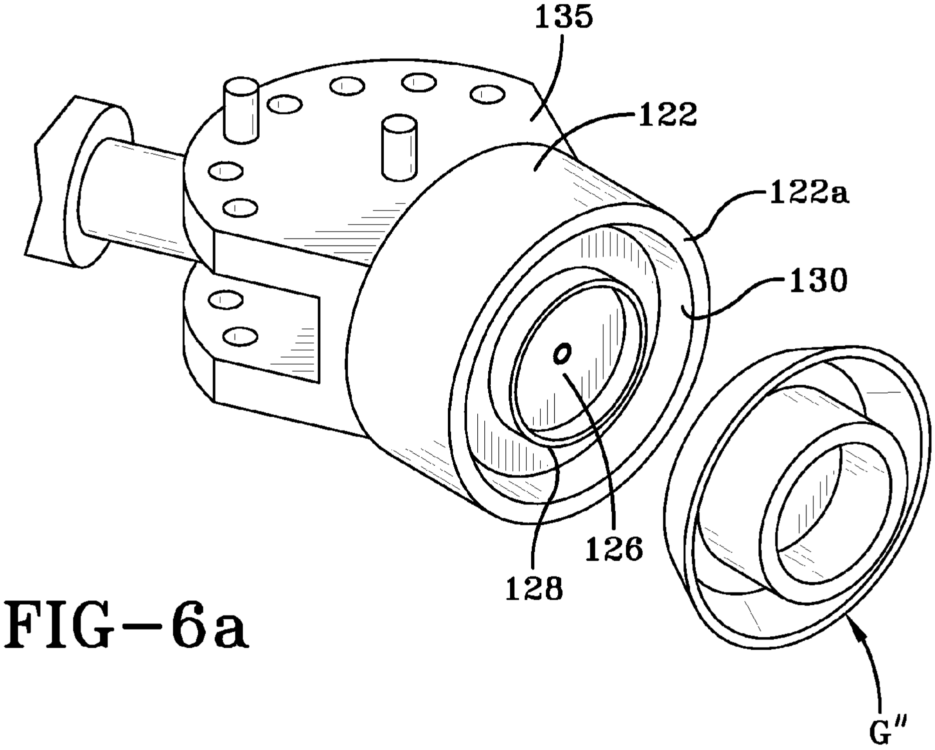
FIG. 6*a* is an enlarged view of another exemplary head portion of a grommet installation device of the present invention, along with an exemplary grommet the device may be used to install.
Figure 6B:
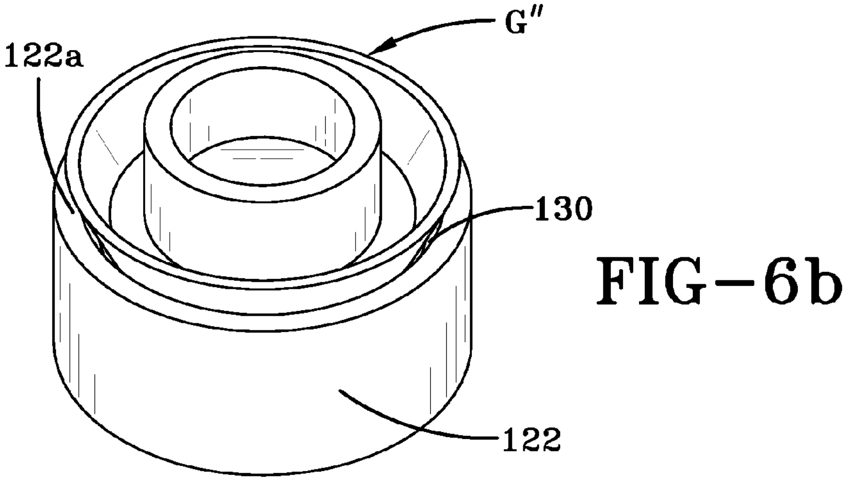
FIG. 6*b* shows the grommet and head portion of FIG. 6*a* with the grommet releasably retained by the head portion.

Another exemplary grommet retaining/installing head 122 of the present invention is depicted in the enlarged views of FIGS. 6*a*-6*b*, along with a grommet G" that may be installed therewith. As shown, the head 122 is again provided with an aperture 126 at an installation end 122*a* thereof. The aperture 126 is again adapted to releasably retain the grommet G" during the grommet installation process. However, unlike the head 116 of FIGS. 5*a*-5*b*, this aperture 126 is formed by an insert 128 installed within a recess 130 in the head 122. The head 122 may be connected to a handle by an adjustable mounting bracket 135 or any other mounting structure previously shown and/or described.

Figure 7A:
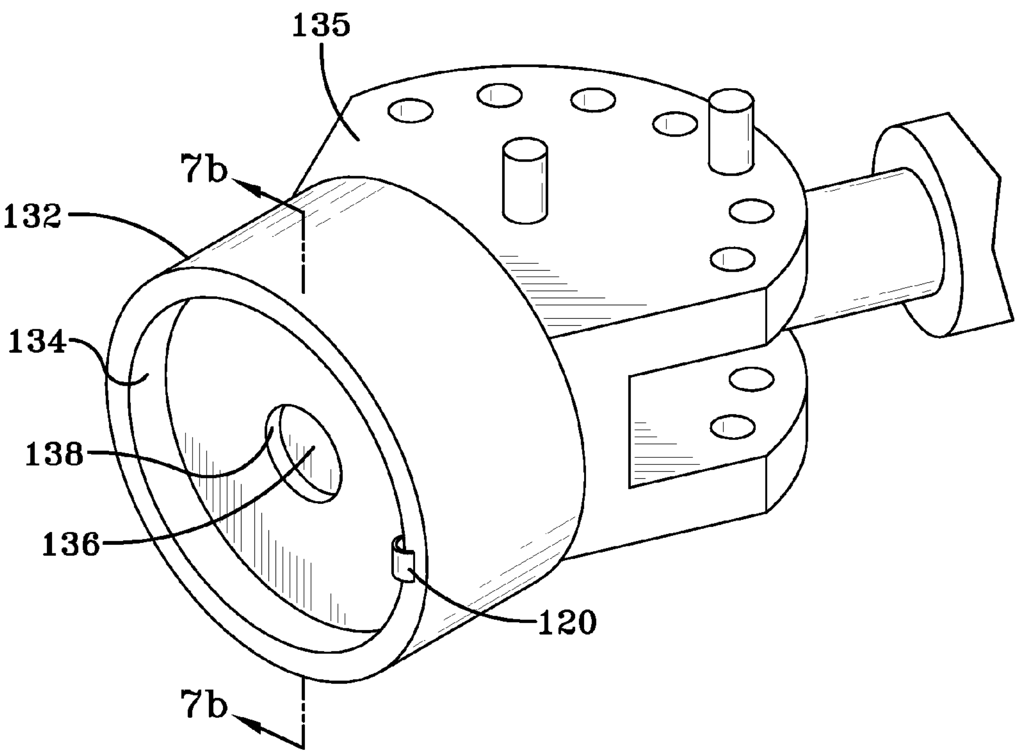
FIG. 7*a* is an enlarged view of an exemplary head portion of a grommet installation device of the present invention, the head portion adapted to install both rubber and metallic grommets.
Figure 7B:
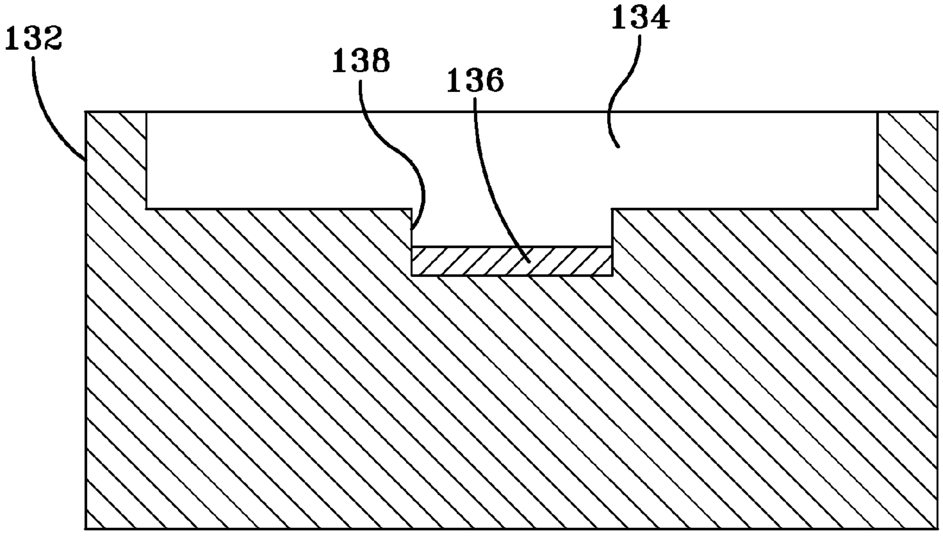
FIG. 7*b* is a cross-sectional view of the head portion of FIG. 7*a* along the section line shown.

In yet another embodiment, a head 132 of a grommet device of the present invention may include a magnet 136. As shown in FIG. 7, the magnet 136 may be set into the center of a grommet receiving aperture 134 located in the head 122. Other magnet locations are obviously possible, depending largely on the geometry of the associated grommet(s). Such a magnet 136 may be used to retain grommets of metallic construction.

A magnet may be located only in a head that is used to install metallic grommets. Alternatively, as shown in FIG. 7, a magnet 136 may be located in a head 132 that is used to install both metallic and rubber or plastic grommets. In such a case, additional retention elements, such as a flat spring 120 may also be affixed to the head 132. A magnet may be affixed to a head in any number of ways, such as with a fastener, by an adhesive, or by insertion into a complimentary receiving aperture 138 (as shown in FIG. 7). If desired, such a receiving aperture 138 may be provided with threads to engage a like-threaded magnet. Other magnet attaching techniques would be apparent to one skilled in the art.

The installation end of a head of the present invention may be constructed from various materials including, without limitation, fiberglass, plastics and metals. The installation end may be constructed from the same or a different material than its associated projection(s) and/or aperture. For example, a projection(s) may be comprised of a different material that is installed onto/into a head. Similarly, an aperture in a head may include an insert of a dissimilar material. In alternative embodiments, depending upon the materials used to the construct the head, and/or other design and operational factors, one skilled in the art would understand that a projection(s) or an aperture insert may be attached to an installation end of a head by any number of fastening means, such as with various threaded or non-threaded fasteners, with adhesives, by welding, etc.

In operation, a grommet of interest is provided and installed to the head of grommet device of the present invention. As explained above, the head then releasably retains the grommet by frictional (or magnetic force when the grommet is metallic). With an installer grasping the device by the a handle portion thereof, the grommet, releasably retained by the head of the grommet device, is then inserted into a corresponding opening by the installer. Thereafter, features of the grommet engage the edges and/or surrounding area of the opening, as would be understood by one of skill in the art. With the grommet engaged with the opening, the grommet installing device is withdrawn. It has been found that a slight twisting or tilting of the head of a grommet device of the present invention may aid in release of a grommet therefrom.

As described above, a user of at least certain embodiments of a device of the present invention may adjust the angle between the head and the handle to best reach and engage a grommet with an associated opening. The length of the handle may be similarly adjusted on certain embodiments of a device of the present invention. For example, it has been found that setting the head 102 of the device D at an acute angle to the handle 100 and somewhat extending the handle, facilitates installation of grommets to openings located in the bottom wall of a vehicle trunk.

As mentioned above, it is possible to associate a device, or a portion thereof, with an automated grommet installation apparatus. An automated apparatus may employ any embodiment of a grommet device of the present invention, or alternatively, an automated apparatus may employ just the head portion of such an embodiment. For example, any of the exemplary heads shown and described herein may be attached to a robotic arm or some other dedicated and automated apparatus designed and/or programmed to effect grommet installation.

Whether designed for manual or automatic operation, a grommet device of the present invention may be associated with an automatic loading (feeding) device. Such a feeding device is operative to automatically supply grommets to the installation head of a grommet device of the present invention. For example, a supply of grommets may be maintained in a stacked arrangement within a feed tube, the feed tube associated with the installation head of a grommet device of the present invention.

Additionally, in any embodiment of the present invention, it is possible to use an adhesive material to further generate increased retention force between a grommet and an associated opening. When used, an adhesive material may be applied to either or both of the grommet and the opening. Such an adhesive material may also act as a temporary lubricant that reduces the force required to insert a grommet into an opening.

While certain embodiments of the present invention are described in detail above, the scope of the invention is not to be considered limited by such disclosure, and modifications are possible without departing from the spirit of the invention as evidenced by the following claims:

What is claimed is:

1. A device for installing a grommet, comprising:
a handle with a first end for grasping by a user;
a head attached to a second end of the handle, said head having an installation end; and
a retention element on said installation end of said head and a retention element on said grommet, the retention elements cooperative to releasably retain the grommet on said installation end of said head via friction.

2. The device of claim 1, wherein the handle is of telescoping design.

3. The device of claim 2, wherein the handle further comprises a retention element that releasably fixes the length of the handle.

4. The device of claim 1, wherein an angle between the handle and the head is adjustable.

5. The device of claim 1, wherein the grommet is metallic and the head further comprises a magnet that releasably retains the grommet by magnetic force.

6. The device of claim 1, further comprising an aperture in the installation end of the head for receiving a portion of the grommet.

7. The device of claim 6, wherein the head further includes a flat spring that projects into the aperture to retain the grommet by pressing against a wall thereof.

8. The device of claim 1, further comprising one or more projections extending from said installation end of said head to releasably retain said grommet by engaging one or more corresponding cavities therein.

9. A device for installing a grommet into an opening, comprising:
a handle with a first end for grasping by a user, said handle being of telescoping design; and
a head pivotably connected to a second end of the handle, said head and said grommet each having a retention element that together are cooperative to releasably retain the grommet at an installation end of the head via a frictional force that is less than the frictional force between the grommet and an opening to which it is installed.

10. The device of claim 9, wherein the grommet is metallic and the head further comprises a magnet that releasably retains the grommet by magnetic attraction therebetween.

11. The device of claim 9, further comprising an aperture in the first end of the head that surrounds at least a part of the grommet.

12. The device of claim 11, further comprising a flat spring that extends into said aperture to retain the grommet in said aperture by pressing against a side of the grommet.

13. The device of claim 9, further comprising one or more projections extending from said installation end of said head to releasably retain said grommet by engaging one or more corresponding cavities therein.

14. The device of claim 9, wherein a first end of the head is releasably affixed to said handle.

15. A device for installing a grommet, comprising:
a handle with a first end for grasping by a user;
a head attached to a second end of the handle, an installation end of said head having an aperture for receiving a portion of the grommet; and
a flat spring on said head that projects into the aperture to retain the grommet by pressing against a wall thereof.

* * * * *